UNITED STATES PATENT OFFICE.

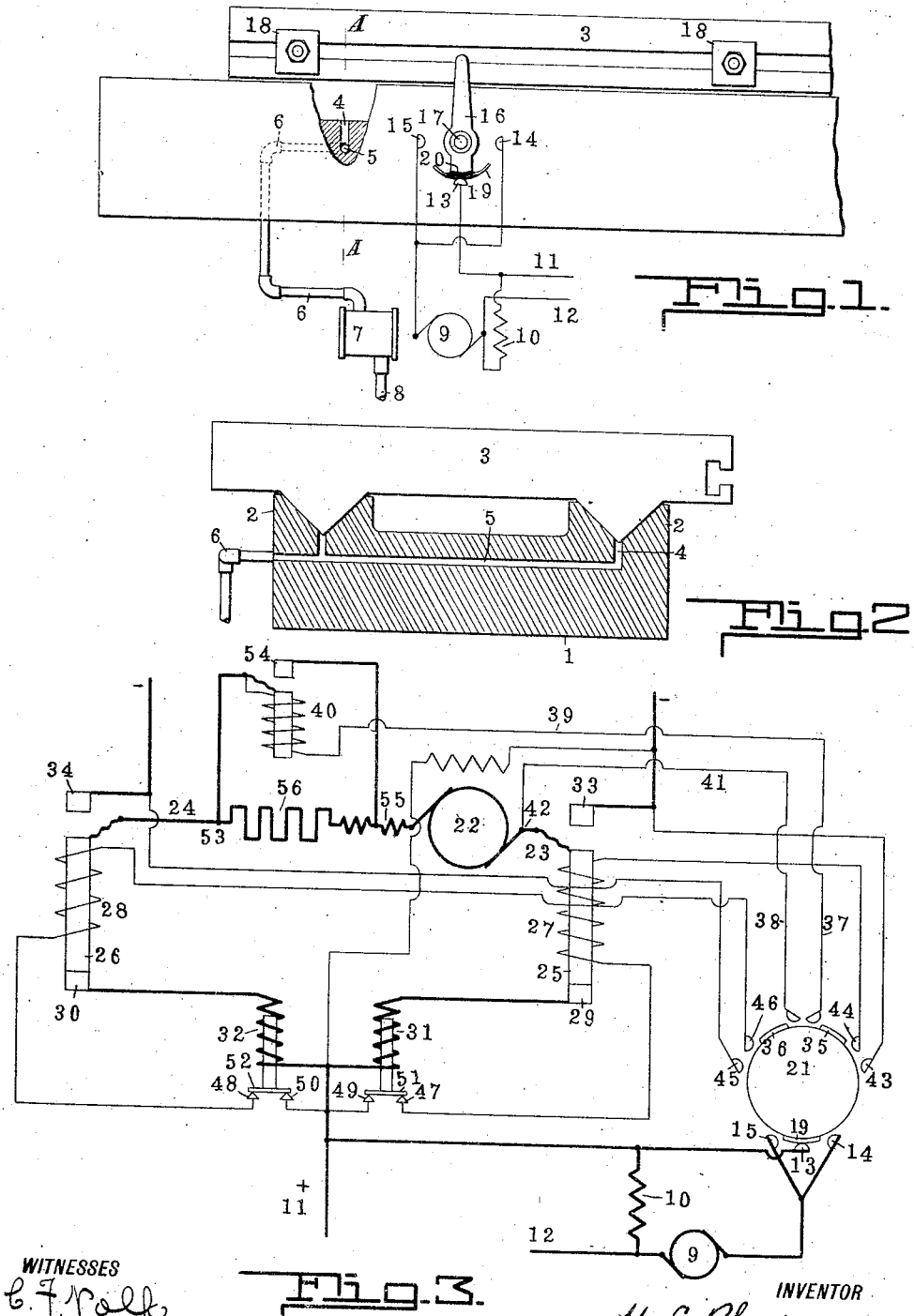

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

SYSTEM OF LUBRICATION.

1,296,744. Specification of Letters Patent. Patented Mar. 11, 1919.

Application filed September 11, 1915. Serial No. 50,163.

*To all whom it may concern:*

Be it known that I, HAROLD L. BLOOD, a citizen of the United States, residing at Plainfield, in the county of Union and State of New Jersey, have invented certain new and useful Improvements in Systems of Lubrication, of which the following is a full, clear, and exact description, such as will enable others skilled in the art to which it appertains to make and use the same.

The invention relates to a system of lubrication primarily adapted for a machine having a normally sliding part which is frequently stopped, the system providing for the control of the lubrication in accordance with the movement or non-movement of the sliding part. The invention also relates to certain electrical devices which, in the preferred embodiment of the invention, are used for operating and controlling the lubricating system.

In a machine such as a planer having a reciprocating part with sliding surfaces to which a lubricant is supplied under pressure, it is desirable to discontinue the supply when there is no relative motion of the surfaces, since at such times the lubricant not being carried away between the surfaces would tend to overflow, and the pump would be working against abnormal pressure. To provide merely for the manual control of the supply of lubricant would make it possible for the supply to be shut off and then for the machine to be restarted without lubrication.

One of the important objects of the present invention is therefore to provide in a planer or other machine having relatively sliding surfaces, automatically acting means which serve to start the supply of lubricant upon the starting of the machine even though the said supply has been theretofore shut off manually or otherwise. Another object of the invention is to provide simple automatic means whereby the supply of lubricant will be interrupted when the relative motion of the sliding surfaces ceases, but which will insure the prompt resumption of said supply when motion again occurs, without attention from the operator.

Other objects will be in part obvious and in part pointed out hereinafter.

The invention accordingly consists in the features of construction, combinations of elements, and arrangement of parts, which will be exemplified in the construction hereinafter set forth, and the scope of the application of which will be indicated in the following claims.

In the accompanying drawings, wherein is illustrated various possible embodiments of this invention, Figure 1 is a side elevation of a portion of a mechanism having the improved oil pump motor control applied thereto;

Fig. 2 is a cross section on line A—A of Fig. 1; and

Fig. 3 is a diagrammatic illustration of an electrical system for controlling the driving motor of a planer or other kind of machine tool, showing the manner in which the improved oil pump motor control may be applied thereto.

Similar reference characters refer to similar parts throughout the several views of the drawing.

Referring now more particularly to Figs. 1 and 2, there is illustrated at 1 the bed of a planing machine, it being understood, however, that the invention is applicable to other types of machines, and that the one shown herein is merely for the purpose of illustration. The planer bed 1 is formed at its sides with upward extending grooved members 2, in which slides a carriage member 3 for carrying the work which is to be operated upon. To provide for the introduction of a lubricant, there are provided vertical channels 4 which communicate with the bottoms of the grooves. Any desired number of these vertical channels may be provided. These channels communicate with horizontal channels 5, which in turn connect with a pipe 6 through which oil may be forced by a suitable means such as a pump 7, the intake 8 of which leads from an appropriate source of oil supply.

The oil pump 7 is preferably so driven as to be operable independently of the member 3. When this member is a reciprocating carriage, such as the planer table here shown, the oil pump driving means (whether operable independently of the carriage or otherwise) is preferably constructed and connected for movement always in the same direction notwithstanding the repeated reversals of the mechanism for driving the carriage. By preference I use a separate motor which can most conveniently be an electric motor such as indicated at 9 having a shunt field 10 connected across the supply mains 11 and 12. The former main leads to a fixed contact 13, while the other main leads to one terminal of the armature, the other terminal of which is connected to a pair of contacts 14 and 15 symmetrically disposed on opposite sides of the contact 13.

Means are provided for interrupting the flow of lubricant upon cessation of the sliding movement of the table, and when a pump is used as herein shown and described, I prefer to effect the interruption of lubrication by stopping the pump. When the pump is driven by a separate motor as herein shown and described, the stopping of the pump can most conveniently be effected by stopping the motor, as for instance by interrupting the circuit thereof when the motor is an electric one. It will be understood that when I refer to interrupting or stopping the lubricating action I do not mean to limit myself to a complete shutting off of the supply of lubricant, but I mean to include any such diminution of the flow of lubricant as is sufficient to accomplish the desirable results contemplated. In the simple embodiment of the invention shown in Fig. 1, there is provided a lever 16 pivoted at 17 to the bed of the planer. Adjustably mounted on the planer table are two dogs 18 adapted to engage the lever 16 and move it in opposite directions as the table reciprocates. There is formed on the lower end of the lever 16, a curved contact face 19 of sufficient extent to bridge the contacts 13 and 14 or 13 and 15, according as the upper end of the lever 16 is thrown to the left or to the right respectively. If necessary, the contact face 19 may be insulated from the remaining portions of the lever as by a strip of insulation 20.

It will be obvious from the foregoing description of the apparatus that whenever the lever 16 is thrown to the right or to the left by means of the dogs 18 on the movable carriage that a circuit will be completed through the motor and the pump will be operated to supply oil to the machine. It will also be seen that the motor will always rotate in the same direction, since the current through its field and armature is never reversed. During the normal operation of the machine the lever 16 passes from one to the other of its extreme positions so quickly that the pump motor does not come to rest. When it is desired to stop the machine, the lever 16 is moved to its vertical position, as shown in the drawing, in which position the circuit through the pump motor, will be broken and no oil will be forced into the machine. It will be seen that the construction is such that when the lever 16 has been moved to stop the lubrication (by stopping the pump and the motor) the lubrication is automatically started promptly upon the movement of the table in either direction. When such movement occurs the lever 16 will be engaged by one of the dogs 18 thus closing the motor circuit and starting the motor and the pump. In accordance with my invention therefore, it is possible for the lubricating action to be stopped when the machine is idle, thus avoiding the action of the pump against abnormal pressure and at the same time it is impossible for the operator through carelessness or oversight to start the machine without also starting the lubrication.

In machines of the type herein illustrated, it is customary to provide a lever on the side of the bed thereof for controlling the driving mechanism, which, so far as many features of my invention are concerned, may be of any usual or preferred form. A lever for this purpose may be similar in construction and mounting to the lever 16 already described, and it is, in fact, preferable to make use of the same lever for controlling both the main driving mechanism and the lubricating mechanism. In Fig. 3 I have shown a device operable by the lever 16 and adapted to control both mechanisms. In the construction illustrated the main drive mechanism comprises a reversible electric motor and the lubricating system comprises a pump and an electric motor such as already described.

In this figure the motor 9 having a shunt field 10 and supplied with current from the mains 11 and 12 is adapted to drive the oil pump substantially the same as in Fig. 1. Likewise the contacts 13, 14, and 15 for controlling the operation of the motor are the same as in Fig. 1, but for convenience, the bridging contact 19 is placed upon the surface of a drum 21 instead of upon the lever 16, which controls the actuation of this drum. The drum 21 is adapted to control the motor 22, which drives the reciprocating table of the planer mechanism. The armature of the last named motor is connected by conductors 23 and 24 with the plungers 25 and 26 of two solenoids 27 and 28 respectively. In the normal or deënergized condition of the solenoids, their plungers rest upon contacts 29 and 30 respectively, which are connected through solenoids 31 and 32 respectively with the positive main 11. When the solenoids 27 and 28 are energized their plungers engage contacts 33 and 34 respectively, which are connected to the negative main.

The drum 21 has upon its surface two contact plates 35 and 36, which, when the machine is not in operation, occupy the position shown. Midway between these contact plates are spring contacts 37 and 38, the former of which is connected by conductor 39 to a solenoid 40, the purpose of which will be hereinafter described, while the latter is connected by conductor 41 to one terminal 42 of the motor armature.

The contact plate 35 is adapted, when the drum is rotated clockwise, to bridge two spring contacts 43 and 44, while contact plate 36 is adapted to bridge spring contacts 45 and 46 by an opposite rotation of the drum 21. Contacts 43 and 45 are connected to the negative main, while contact 44 is connected to one end of the solenoid 27, and contact 46 is connected to one end of the solenoid 28 by conductors, as shown. The other terminals of the solenoids are connected to contacts 47 and 48 respectively. Adapted to coöperate with the last named contacts are contacts 49 and 50 connected to the positive main, as shown. Solenoid 31 has upon its plunger a bridging piece 51 adapted when the solenoid is deënergized to complete a circuit between contacts 47 and 49. A similar member 52 performs the same function with respect to solenoid 32 and contacts 48 and 50.

The solenoid 40, as previously stated, has one terminal connected to the spring contact 37 adjacent drum 21, while the other terminal thereof is connected to conductor 24 at point 53. The plunger of this solenoid is adapted when the latter is energized to engage a contact 54, which is connected to the armature circuit of the motor at point 55 between which and the point 53 there is a resistance 56.

When the planer is inoperative, the drum 21 occupies the position shown in Fig. 3, the operating lever 16 being in the position shown in Fig. 1. At this time the operating circuits of the oil pump motor 9 and the propulsion motor 22 will be broken so that no oil will be supplied to the machine when it is at rest. If now the machine be started by throwing the operating lever 16 to the right as viewed in Fig. 1, the drum 21 will be rotated clockwise, contact plate 35 will bridge contacts 43 and 44 while contact plate 36 will bridge contacts 37 and 38. Since in the normal condition of the apparatus, solenoids 31 and 32 are deënergized, contacts 47—49 and 48—50 will be bridged by the plates on the plungers of the solenoids. In the above stated position of the drum 21, circuit will be established from the positive main 11 through contacts 49, 51, 47, solenoid 27, contacts 44, 35, 43, to the negative main. The solenoid 27 will accordingly be energized, lifting its plunger against contact 33, which will establish a circuit f the propulsion motor 22 as follows: fro positive main 11 through solenoid 32, contact 30 and plunger 26 of solenoid 28, conductor 24, resistance 56, armature of motor 22, conductor 23, plunger 25 of solenoid 27, contact 33 to the negative main. The motor will thus begin to rotate in a certain direction causing the travel of the planer table. As previously stated at the same time that plate 35 bridges contacts 34 and 44, plate 36 bridges contacts 37 and 38, and when current flows in the circuit of the propulsion motor 22 the solenoid 40, which is thus connected in shunt about the motor armature and resistance 56 will come into action, but it is purposely made somewhat sluggish so that an appreciable interval of time will elapse before its plunger is raised against contact 54. When this does occur a short circuit will be established around the resistance 56, thus eliminating the same from the circuit of the motor to increase the speed of the latter. It will thus be seen that the solenoid 40 acts to control the starting of the motor by removing resistance from its armature circuit.

The motor will continue to operate and drive the planer table until the latter reaches the limit of its stroke when one of the dogs 18 thereon will strike the lever 16 throwing it to its other extreme position. As the plate 35 leaves contacts 43 and 44, solenoid 27 will be deënergized, and its plunger 25 will fall upon contact 29. This will occur before the plate 36 bridges the contacts 45, 46, so that for a brief interval, there is a closed circuit from the armature of the motor through conductor 23, plunger 25 of solenoid 27, contact 29, solenoid 31, solenoid 32, contact 30, plunger 26 of solenoid 28, conductor 24, resistance 56, to the other terminal of the motor armature. The motor 22 is now running as a generator, and the current induced in its armature will pass through the above described circuit, and exert a powerful braking effect upon the motor. The braking current will be sufficient to energize the solenoids 31 and 32 for a certain length of time, so that even though the plate 36 bridges contacts 45, 46, the circuit through the solenoid 28 will not be completed until the braking current practically ceases and the plunger of the solenoid 32 drops to bridge the contacts 48, and 50 leading from the positive main. When this does occur, the solenoid 28 will be energized over a circuit analogous to that previously traced with respect to solenoid 27. A circuit is now established through the propulsion motor 22 in a reverse direction, so that the planer table driven by the motor travels oppositely to what it did in the first instance. Since the contacts 37 and 38 are now bridged by the plate 35, the starting resistance 56 will be eliminated by the solenoid 40 precisely as previously described.

It will also be seen that whenever the drum 21 is moved to one or the other of its operative positions, circuit will be established from the contact 13 through either one or the other of the cor acts 14 and 15, and hence through the armature of the oil pump motor 9. Although the circuit of the propulsion motor 22 has been reversed to cause a reversal of the direction of rotation of the latter, the pump motor will, whenever its circuit is established, rotate in the same direction regardless of the position of the controlling drum 21.

From the foregoing description, it will be seen that this invention provides means for controlling the oil pump motor of machine tool mechanisms that is simple in construction, readily applicable to any form of mechanism, and adapted effectively to control the said motor to prevent its operation at such times as the main driving motor is not in operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:

1. Apparatus of the character described comprising, in combination, a machine tool mechanism having a reciprocating part, means for supplying a lubricant to said mechanism, a motor for operating said means, means for controlling said motor, and means on said reciprocating part for operating said motor controlling means.

2. The combination in a machine provided with a member having slidable engagement with another member, of means adapted to act independently of the movement of the slidable member for supplying lubricant to the bearing surfaces between the two members, means for stopping the flow of lubricant to the said surfaces when the slidable member is stationary, and means for automatically starting the flow of lubricant to the said surfaces when the slidable member is moved.

3. The combination in a machine provided with a reversible member having slidable engagement with another member, of means adapted to act independently of the movement of the slidable member for supplying lubricant to the bearing surfaces between the two members, means for stopping the flow of lubricant to the said surfaces when the slidable member is stationary, and means for automatically starting the flow of lubricant to the said surfaces upon movement of the slidable member in either direction.

4. The combination in a machine provided with an automatically reciprocable member having slidable engagement with another member, of means adapted to act independently of the movement of the reciprocable member for supplying lubricant to the bearing surfaces between the two members, means for stopping the flow of lubricant to the said surfaces when the reciprocable member is idle, and means automatically operable to start the flow of lubricant to the said surfaces when the reciprocable member is reciprocated.

5. The combination in a machine provided with a reciprocable member having slidable engagement with another member, of means adapted to act independently of the movement of the reciprocable member for supplying lubricant to the bearing surfaces between the two members, means for stopping the flow of lubricant to the said surfaces when the reciprocable member is idle, and means automatically operable by the reciprocable member to start the flow of lubricant to the said surfaces when the said member is reciprocated.

6. In a planer, the combination with the bed and the reciprocable table slidably mounted on the bed, of means adapted to act independently of the movement of the table for supplying lubricant to the bearing surfaces between the bed and the table, means for stopping the flow of lubricant to the said surfaces when the table is idle, and means automatically operable to start the flow of lubricant to the said surfaces when the table is reciprocated.

7. The combination in a machine provided with a member having slidable engagement with another member, of means adapted to act independently of the movement of the slidable member for supplying lubricant to the bearing surfaces between the two members, and means for automatically stopping the flow of lubricant to the said surfaces upon cessation of the movement of the slidable member.

8. The combination in a machine provided with an automatically reciprocable member having slidable engagement with another member, of means adapted to act independently of the movement of the reciprocable member for supplying lubricant to the bearing surfaces between the two members, and means for automatically stopping the flow of lubricant to the said surfaces upon cessation of movement of the reciprocable member.

9. In a planer, the combination with the bed and the table slidably mounted on the bed, of means for reciprocating the table, means adapted to act independently of the movement of the table for supplying lubricant to the bearing surfaces between the bed and the table, and means for automatically stopping the flow of lubricant to the said surfaces upon cessation of movement of the table.

10. The combination in a machine provided with a member having slidable engagement with another member, of means adapted to act independently of the movement of the slidable member for supplying lubricant to the bearing surfaces between the two members, means for automatically stopping the flow of lubricant to the said surfaces upon cessation of movement of the slidable member, and means for automatically starting the flow of lubricant to the said surfaces when the slidable member is moved.

11. In a planer, the combination with the bed and the reciprocable table slidably mounted on the bed, of means adapted to act independently of the movement of the table for supplying lubricant to the bearing surfaces between the bed and the table, means for automatically stopping the flow of lubricant to the said surfaces upon cessation of movement of the table, and means automatically operable to start the flow of lubricant to the said surfaces when the table is reciprocated.

12. The combination in a machine provided with a reciprocable member having slidable engagement with another member, of means for supplying lubricant to the bearing surfaces between the two members, and means automatically controlled electrically for stopping the flow of lubricant to the said surfaces when the said member is idle.

13. The combination in a machine provided with a member having slidable engagement with another member, of a pump operable independently of the slidable member for supplying lubricant to the bearing surfaces between the two members, means dependent upon the movement or non-movement of the slidable member for automatically stopping or starting the pump.

14. The combination in a machine provided with a member having slidable engagement with another member, of a pump for supplying lubricant to the bearing surfaces between the two members, a pump driving motor operable independently of the slidable member, and means dependent upon the movement or non-movement of the slidable member for automatically stopping or starting the motor.

15. In a planer, the combination with the bed and the table slidably mounted on the bed, of means for reciprocating the table, a pump for supplying lubricant to the bearing surfaces between the bed and the table, a pump driving electric motor operable independently of the table, a switch for controlling the motor, and means automatically operable by the table and dependent upon the movement or non-movement thereof for moving the said switch to stop or start the motor.

16. The combination in a machine provided with an automatically reciprocable member having slidable engagement with another member, of a reversible drive mechanism for the reciprocable member, an irreversible device for supplying lubricant to the bearing surfaces between the two members, means for stopping the lubricant supplying device when the reciprocable member is idle, and means automatically operable to start the said device when the reciprocable member is reciprocated.

17. The combination in a machine provided with an automatically reciprocable member having slidable engagement with another member, of a reversible drive mechanism for the reciprocable member, an irreversible device for supplying lubricant to the bearing surfaces between the two members, and means for automatically stopping the said lubricant supplying device upon cessation of movement of the reciprocable member.

18. Apparatus of the character described comprising, in combination, a motor, mechanism adapted to be driven by said motor, a switch controlled by movement of said mechanism for reversing said motor, a pump for supplying lubricant to said mechanism, a second motor for operating said pump, and means associated with said switch for controlling the circuit of said pump motor.

19. Apparatus of the character described comprising, in combination, a motor, a reciprocable mechanism driven by the motor, a switch controlled by movement of said mechanism for reversing said motor, a second motor, a pump driven by the second motor and serving to supply lubricant to the said mechanism, and connections for said second motor controlled by said switch, said connections being so arranged that the direction of current through said second motor is not changed when said first motor is reversed.

20. Apparatus of the character described comprising, in combination, a machine tool mechanism having a fixed part and a reciprocating part, a pump for supplying lubricant to said mechanism, a motor for driving said pump, a lever mounted on said fixed part, means on said reciprocating part for operating said lever, contacts connected to one terminal of said motor, a single contact connected to the other terminal of said motor, and a bridging member actuated by said lever and adapted to put either one of said first-named contacts into electrical connection with said single contact in the extreme positions of said lever, said first-named contacts being out of engagement with said bridging member when said lever is in an intermediate position.

21. Apparatus of the character described comprising, in combination, a machine tool mechanism having a reciprocating part, a pump, a motor for driving said pump, a lever mounted on said mechanism adapted to be actuated by the reciprocating part thereof, contacts for controlling the circuit of said motor, and a conducting plate associated with said lever adapted in extreme positions of the latter to complete the circuit of said motor and in an intermediate position to render said motor inoperative, the said contacts being so arranged that said motor always rotates in the same direction irrespective of the position of said switch.

In testimony whereof I affix my signature, in the presence of two witnesses.

HAROLD L. BLOOD.

Witnesses:
    Geo. B. Wean,
    C. W. Beiter.